Dec. 1, 1931.   J. C. HANSON   1,834,616
PISTON ROD WIPER
Filed Oct. 19, 1929   2 Sheets-Sheet 1

Inventor
John C. Hanson

By Clarence A. O'Brien
Attorney

Dec. 1, 1931. J. C. HANSON 1,834,616
PISTON ROD WIPER
Filed Oct. 19, 1929 2 Sheets-Sheet 2
Fig. 3.
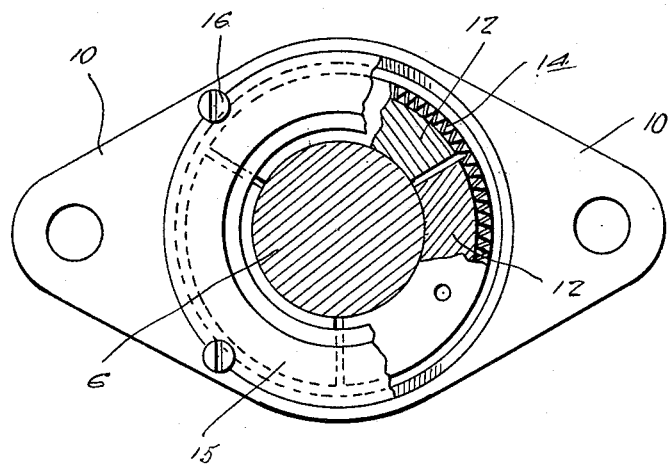
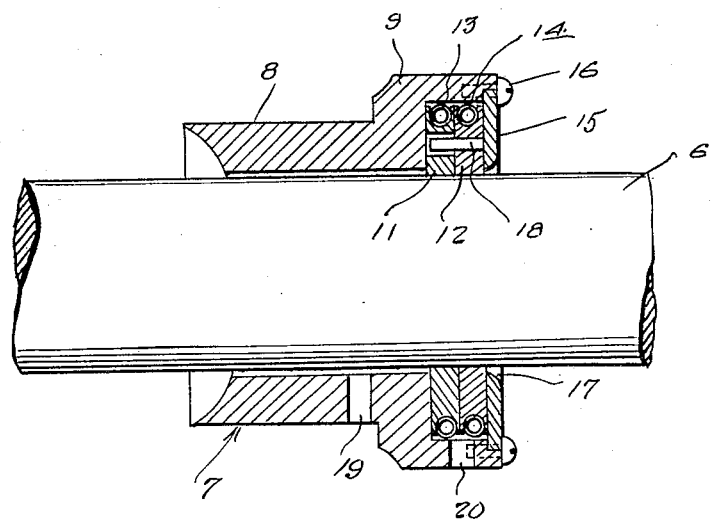
Fig. 4.
Inventor
John C. Hanson
By Clarence A O'Brien
Attorney Patented Dec. 1, 1931

1,834,616

UNITED STATES PATENT OFFICE

JOHN C. HANSON, OF HOMER, LOUISIANA

PISTON ROD WIPER

Application filed October 19, 1929. Serial No. 401,006.

This invention relates to an improved accessory, to be hereinafter known as a piston rod wiper, and the same is adaptable for use in connection with the two cycle gas engines, of a horse power from twenty-five to one hundred sixty-five, for use with compressors and vacuum pumps, to wipe the oil from a piston rod to effect a saving thereof, particularly on machinery embodying a crank case type splash system of the enclosed type of engine, or in any piece of machinery employing the cross head type enclosed crank case.

The principal object is to provide a lubricant wiper, to remove the lubricating oil from the piston rod after it is splashed on the latter by the motion of the movable parts, working in oil in the enclosed crank case, preventing it from traveling through the piston rod packing or packing glands, which ordinarily result in a waste of oil as the vacuum in the cylinder is created by the compression stroke of the engine, causes the oil to be sucked through the gland and into the cylinder.

The principal novelty is predicated upon a practicable organization of mechanical agents or elements, of appropriate design, which are coordinated in a manner to structurally cooperate in producing a useful and satisfactory ensemble which will effectually wipe the oil from the reciprocatory piston rod and at the same time, avoid wear on said rod.

Other features and advantages will become more readily apparent from the following description and drawings.

In the drawings:—

Fig. 3 is a view similar to Fig. 2, with the retaining annulus in place and with portions broken away and shown in section to disclose the detailed arrangement of the elements.

Fig. 4 is a longitudinal sectional view thru the complete assembly.

Figure 1:
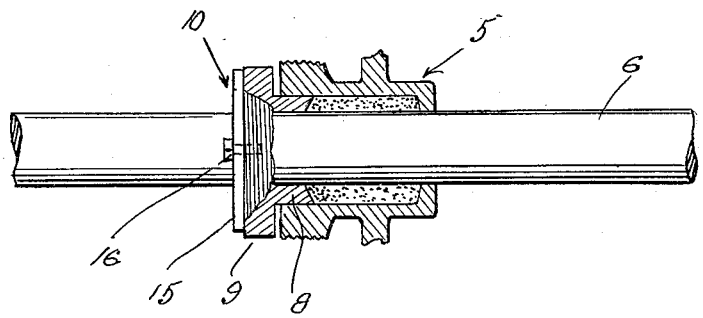
Figure 1 is a view showing the wiper associated with a packing gland and an associated piston rod.
Figure 2:
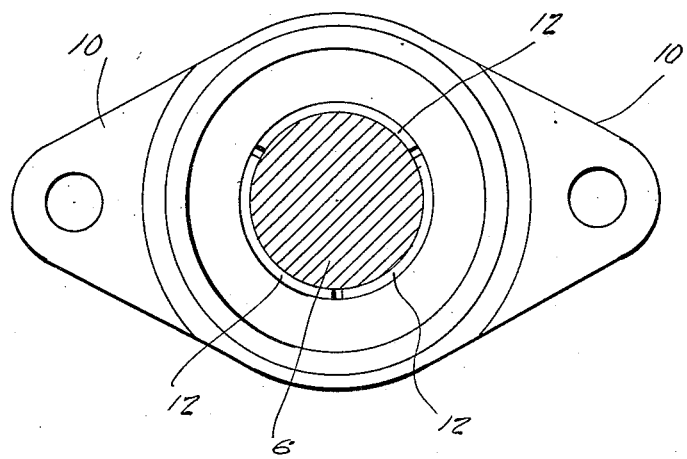
Fig. 2 is an end view of the wiper with the retaining annulus removed.

In Fig. 1, the reference character 5 designates a suitable packing gland through which the piston rod 6 is reciprocated. As before stated, the invention is especially applicable and efficient when employed in the splash system of an enclosed crank case arrangement, in machinery of the species previously mentioned.

Incidentally, the wiper per se, may be directly associated with the packing gland, or mounted in an individual manner for cooperation therewith. In either instance, said wiper being disposed in close proximity to said packing gland. In other words, the wiper may be built in the packing land, at the time of construction, or may be in the form of a supplemental appliance or attachment in marketed machines, of the type not including a wiper.

The wiper has been shown in Fig. 4 and comprises a body member 7 which includes a cylindrical collar 8 having an enlargement 9 at one end formed with diametrically opposite upstanding apertured attaching flanges 10 (see Fig. 3).

The enlarged portion 9 is formed with a counter-bore which constitutes a receptacle or socket for the wiping elements. I have found it expedient and practicable to employ two individual sets of elements and each set embodies a series of three companion segments. The inner segments are distinguished by the reference character 11, and the outer segments at 12.

These segments are formed with peripheral grooves to accommodate coiled contraction springs 13, 14 respectively, whose action is to contract the segments around the piston rod as obvious when examining Fig. 4. This renders the segments self-adjusting, and at the same time provides resilient contact to minimize wear on the piston rods.

I might also mention that the respective segments of the individual sets are disposed so that the adjacent ends are arranged in staggered relation, causing the inner segments 11 to overlap the spaces between the corresponding ends of the outer segments 12.

For the purpose of maintaining the spring pressed wiper element or segment in place, I have found it practical to employ an endless confining or retaining ring 15. This is secured by screws or bolts 16 in the body 9 and has its inner peripheral edge beveled as at 17 and terminating in spaced relation to the circumferential surface of the piston rod to form a clearance space, and to avoid direct contact and wear between the ring and piston rod.

Then too, the segments are provided with holes through which retention pins 18 on the ring 15 extend, thus facilitating the assembly of parts at the time of manufacture. I might also add that the edges or surfaces of the segments 11 and 12 are accurately finished off to insure smooth and non-abrasive contacts with the piston rods, as is evidenced in Fig. 4.

Briefly then, the body comprises a cylindrical collar which embraces the piston rod, the collar being formed at one end with an enlargement, is recessed to provide a casing for receiving and accommodating the spring pressed wiper element or segment. Then too, there is the attaching flanges 10, by means of which the device may be anchored in the crank case, or attached directly to the stuffing box or gland, whichever is desired.

Moreover, I provide drain ports 19 and 20 preferably located at the bottom to facilitate egress of accumulated oils. A careful consideration of the description in connection with the drawings, will enable the reader to obtain a clear understanding of the construction and assembly as well as the features and advantages of the invention. Therefore, a more lengthy description is regarded as unnecessary.

Minor changes in shape, size, materials, and re-arrangement of details, coming within the field of invention claimed may be resorted to in actual practice if desired.

Having thus described my invention, what I claim as new is:—

A piston rod wiper comprising in combination a stuffing box adapted to accommodate a piston rod, a cylindrical body circumjacent the piston rod and having one end thereof receivable in the bore of the stuffing box, the wall of said body at said end being beveled for contact with the adjacent end of the packing arranged within said box, said body at its free end being enlarged, and at said enlarged end provided with an annular recess circumjacent the bore of said body, a pair of annular wiping elements arranged in said recess, and each of said elements including a plurality of segments, yieldable means engageable with the segments of each element yieldably urging the same into wiping contact with the piston rod, a retaining ring substantially closing said recess for confining therein said wiping elements, means for securing said retaining ring in position on said body, and said body at said enlarged end being provided with oppositely expanding apertured attaching flanges, and said body adjacent said enlarged end, and the said enlarged end of the body, respectively being provided with a drain port.

In testimony whereof I affix my signature.

JOHN C. HANSON.